May 5, 1970 F. S. GUTLEBER 3,510,595

IMPULSE AUTOCORRELATION FUNCTION MULTIPLEX SYSTEM

Filed Aug. 11, 1967 2 Sheets-Sheet 1

INVENTOR.
FRANK S. GUTLEBER
BY Alfred C. Hill
AGENT

IMPULSE AUTOCORRELATION FUNCTION MULTIPLEX SYSTEM

Filed Aug. 11, 1967 2 Sheets-Sheet 2

Fig. 2

| CODE | FORMAT | | | | | | | | NUMBER OF DIGITS (N) X $\phi(t)$ AUTO CORRELATION FUNCTION | | | | | | | |
|---|---|---|---|---|---|---|---|---|---|---|---|---|---|---|---|---|
| 1 | 1 | 1 | 0 | 0 | 0 | 0 | 0 | 0 | +8 | +4 | 0 | 0 | 0 | 0 | 0 | +4 |
| 2 | 1 | 0 | 1 | 0 | 0 | 0 | 0 | 0 | +8 | 0 | +4 | 0 | 0 | 0 | +4 | 0 |
| 3 | 1 | 0 | 0 | 1 | 0 | 0 | 0 | 0 | +8 | 0 | 0 | +4 | 0 | +4 | 0 | 0 |
| 4 | 1 | 0 | 0 | 0 | 1 | 0 | 0 | 0 | +8 | 0 | 0 | 0 | +8 | 0 | 0 | 0 |
| 5 | 1 | 1 | 1 | 0 | 0 | 0 | 0 | 0 | +8 | +4 | 0 | −4 | −4 | −4 | 0 | +4 |
| 6 | 1 | 1 | 0 | 1 | 0 | 0 | 0 | 0 | +8 | 0 | 0 | 0 | −4 | 0 | 0 | 0 |
| 7 | 1 | 1 | 0 | 0 | 1 | 0 | 0 | 0 | +8 | 0 | −4 | 0 | +4 | 0 | −4 | 0 |
| 8 | 1 | 1 | 0 | 0 | 0 | 1 | 0 | 0 | +8 | 0 | −4 | 0 | +4 | 0 | −4 | 0 |
| 9 | 1 | 1 | 0 | 0 | 0 | 0 | 1 | 0 | +8 | 0 | 0 | 0 | −4 | 0 | 0 | 0 |
| 10 | 1 | 0 | 1 | 0 | 0 | 1 | 0 | 0 | +8 | −4 | 0 | +4 | −4 | +4 | 0 | −4 |
| 11 | 1 | 1 | 1 | 1 | 0 | 0 | 0 | 0 | +8 | +4 | 0 | −4 | −8 | −4 | 0 | +4 |
| 12 | 1 | 1 | 1 | 0 | 1 | 0 | 0 | 0 | +8 | 0 | 0 | −4 | 0 | −4 | 0 | 0 |
| 13 | 1 | 1 | 1 | 0 | 0 | 1 | 0 | 0 | +8 | 0 | −4 | 0 | 0 | 0 | −4 | 0 |
| 14 | 1 | 1 | 0 | 1 | 0 | 1 | 0 | 0 | +8 | −4 | 0 | 0 | 0 | 0 | 0 | −4 |
| 15 | 1 | 1 | 0 | 1 | 0 | 0 | 1 | 0 | +8 | −4 | 0 | +4 | −8 | +4 | 0 | −4 |
| 16 | 1 | 1 | 0 | 0 | 1 | 1 | 0 | 0 | +8 | 0 | −8 | 0 | +8 | 0 | −8 | 0 |

| | FORMAT | | | | | $N\phi(t)$ | | | | |
|---|---|---|---|---|---|---|---|---|---|---|
| CODE A | | 1 | 0 | 0 | 0 | | −1 | 0 | +1 | +4 |
| MATE A | 0 | 1 | 0 | 0 | 0 | +1 | 0 | +1 | 0 | +5 |
| CODE B | | 1 | 0 | 0 | 0 | | −1 | 0 | +1 | +4 |
| MATE B | 0 | 1 | 1 | 0 | 0 | +1 | 0 | −3 | 0 | +5 |
| CODE C | | 0 | 1 | 0 | 0 | | +1 | 0 | −1 | +4 |
| MATE C | 0 | 1 | 0 | 0 | 0 | +1 | 0 | +1 | 0 | +5 |
| CODE D | | 0 | 1 | 0 | 0 | | +1 | 0 | −1 | +4 |
| MATE D | 0 | 1 | 1 | 0 | 0 | +1 | 0 | −3 | 0 | +5 |
| CODE E | | 0 | 0 | 1 | 0 | | +1 | 0 | −1 | +4 |
| MATE E | 0 | 1 | 0 | 0 | 0 | +1 | 0 | +1 | 0 | +5 |
| CODE F | | 0 | 0 | 1 | 0 | | +1 | 0 | −1 | +4 |
| MATE F | 0 | 1 | 1 | 0 | 0 | +1 | 0 | −3 | 0 | +5 |
| CODE G | | 0 | 0 | 0 | 1 | | −1 | 0 | +1 | +4 |
| MATE G | 0 | 1 | 0 | 0 | 0 | +1 | 0 | +1 | 0 | +5 |
| CODE H | | 0 | 0 | 0 | 1 | | −1 | 0 | +1 | +4 |
| MATE H | 0 | 1 | 1 | 0 | 0 | +1 | 0 | −3 | 0 | +5 |

Fig. 3

INVENTOR.
FRANK S. GUTLEBER
BY Alfred C. Hill
AGENT

1

3,510,595

IMPULSE AUTOCORRELATION FUNCTION MULTIPLEX SYSTEM

Frank S. Gutleber, Wayne, N.J., assignor to International Telephone and Telegraph Corporation, Nutley, N.J., a corporation of Maryland Filed Aug. 11, 1967, Ser. No. 659,915
Int. Cl. H04j 7/00
U.S. Cl. 179—15 10 Claims

ABSTRACT OF THE DISCLOSURE

A pseudo-noise multiplexed code class of the type where at least one of a plurality of code signals has an autocorrelation function including an impulse output upon time coincidence of the code signal and its replica and a zero output at all other times. All the code signals are separately correlation detected and the resultant detected outputs are coincidence detected to provide an output signal having an impulse autocorrelation function.

Background of the invention

This invention relates to pulse signalling systems of the code type and more particularly to an improved autocorrelation technique for use in such pulse signalling systems.

Correlation techniques have been utilized in the past in signal processing systems employing signals in the form of a pulse or a sequence of pulses. Such pulse signalling systems include, for example, radiant energy reflecting systems, such as radar, radio range finders, radio altimeters, and the like; pulse communication systems, such as over-the-horizon systems employing various types of scatter techniques, satellite communication systems and the like; and multiple access systems employing address codes to enable utilization of the multiple access system. Correlation techniques when employed in coded radiant energy reflection systems enhance the resolution of closely spaced reflecting surfaces and in addition, increase the average power transmitted. Correlation techniques employed in pulse communication systems result in increased signal-to-noise ratios without increase of transmitter power and minimize multiple paths effects (fading). Correlation techniques when employed in a multiple access environment also result in increased signal-to-noise ratio without increase of transmitter power and if properly coded prevent or at least minimize the interference or crosstalk between one or more address codes.

According to prior art correlation techniques the received signal is processed by obtaining the product of code elements of the received signal and code elements of a locally generated signal of the same waveform and period as the received signal and integrating the resultant product. The optimum output for such a correlation would be a single peak of high amplitude which has a width substantially narrower than the pulse width of the received signal. Most correlation systems in use today do not produce the desired optimum waveform, but rather provide an output whose waveform has spurious peaks in addition to the desired high amplitude peak. The presence of these spurious peaks is undesirable in that the resolving power of radiant energy reflecting system is reduced, the signal-to-noise ratio of pulse communication systems and multiple access systems and the minimization of multiple path effects of pulse communication systems is reduced to a level below the optimum value.

Previously, a number of improved correlation techniques have been proposed that will result in an impulse correlation function. The term "impulse correlation function" and more specifically, "impulse autocorrelation function," as employed herein, refers to a waveform having a single high amplitude peak completely free from spurious peaks of lower amplitude elsewhere in the waveform.

2

Three proposed improved correlation techniques which are related to the present invention are fully disclosed in three copending applications of F. S. Gutleber Ser. No. 645,697, filed June 13, 1967, Ser. No. 671,382, filed Sept. 28, 1967, and Ser. No. 669,899, filed Sept. 22, 1967, now Pat. No. 3,461,451. These copending applications disclose a number of classes of codes and apparatus for producing the same which result in an increased number and length of code signals of the classes. The classes of codes disclosed include a plurality of pairs of code signals, termed code mates. The code signals forming the code mates have equal amplitude, such as unity amplitude, and in addition, the autocorrelation functions of the code mates are required to provide a peak output at a given time and a zero output or outputs having the same magnitude but opposite polarity at all other times so that when the code mates are detected and the resultant detected outputs are linearly added there is provided an impulse autocorrelation function having an impulse output at the given time and a zero output at all other times. The code mates generated are time or frequency multiplexed for transmission to the detector to provide long code sequences to increase the average transmitting power. The transmitted multiplexed code mates are separated consistent with the type of multiplexing being employed prior to detection and linear addition.

Another proposed improved correlation technique which is related to the present invention is fully disclosed in the copending application of F. S. Gutleber Ser. No. 647,154, filed June 19, 1967. This copending application discloses an additional class of codes and apparatus for producing the same but which contrary to the three previously cited copending applications does not require the code signals of a group to have the same amplitude but rather weights the amplitude of the code signals of a code group so that prior to linear addition thereof the autocorrelation functions of the code signals of the group produce a peak output at a given time and a zero output or magnitudes and polarity such that they cancel one another and, thus, become zero when linearly added together. The number of code signals in a code group are not limited to two and in fact may be three or more code signals having the above requirements for their autocorrelation functions so that when they are linearly added together there is provided an impulse autocorrelation function having an impulse output at a given time and a zero output at all other times. As in the code classes of the previously cited three copending applications, the code signals of the group are multiplexed for transmission to the detector to provide long code sequences to increase the average transmitting power. The transmitted multiplexed code mates are separated consistent with the type of multiplexing being employed prior to detection and linear addition.

Summary of the invention

An object of this invention is to provide a pseudonoise multiplexed code class in addition to the pseudonoise multiplexed code classes of the above cited copending applications resulting in an output signal having an impulse autocorrelation function.

Another object of this invention is to provide a system incorporating a hybrid correlation-coincidence detector to obtain an output signal having an impulse autocorrelation function.

A feature of this invention is the provision of a system to provide an output signal having an impulse autocorrelation function comprising a source of a plurality of code signals, at least one of the code signals having an autocorrelation function including an impulse output at a given time and a zero output at all other times, a plurality of correlation detection means, one for each of the code signals, coupled to the source, and a coincidence means coupled to the detection means to provide the desired output signal.

Brief description of the drawing

The above mentioned and other features and objects of this invention will become more apparent by reference to the following description taken in conjunction with the accompanying drawings, in which:

FIG. 2 is a tabulation of code signals of the closed code type along with their autocorrelation function times the number of digits in the code signal that may be employed in the system of FIG. 1; and FIG. 3 is a tabulation of codes and their mates of the open code type together with their autocorrelation function times the number of digits in the code signal that may be employed in the system of FIG. 1.

Description of the preferred embodiment

Figure 1:
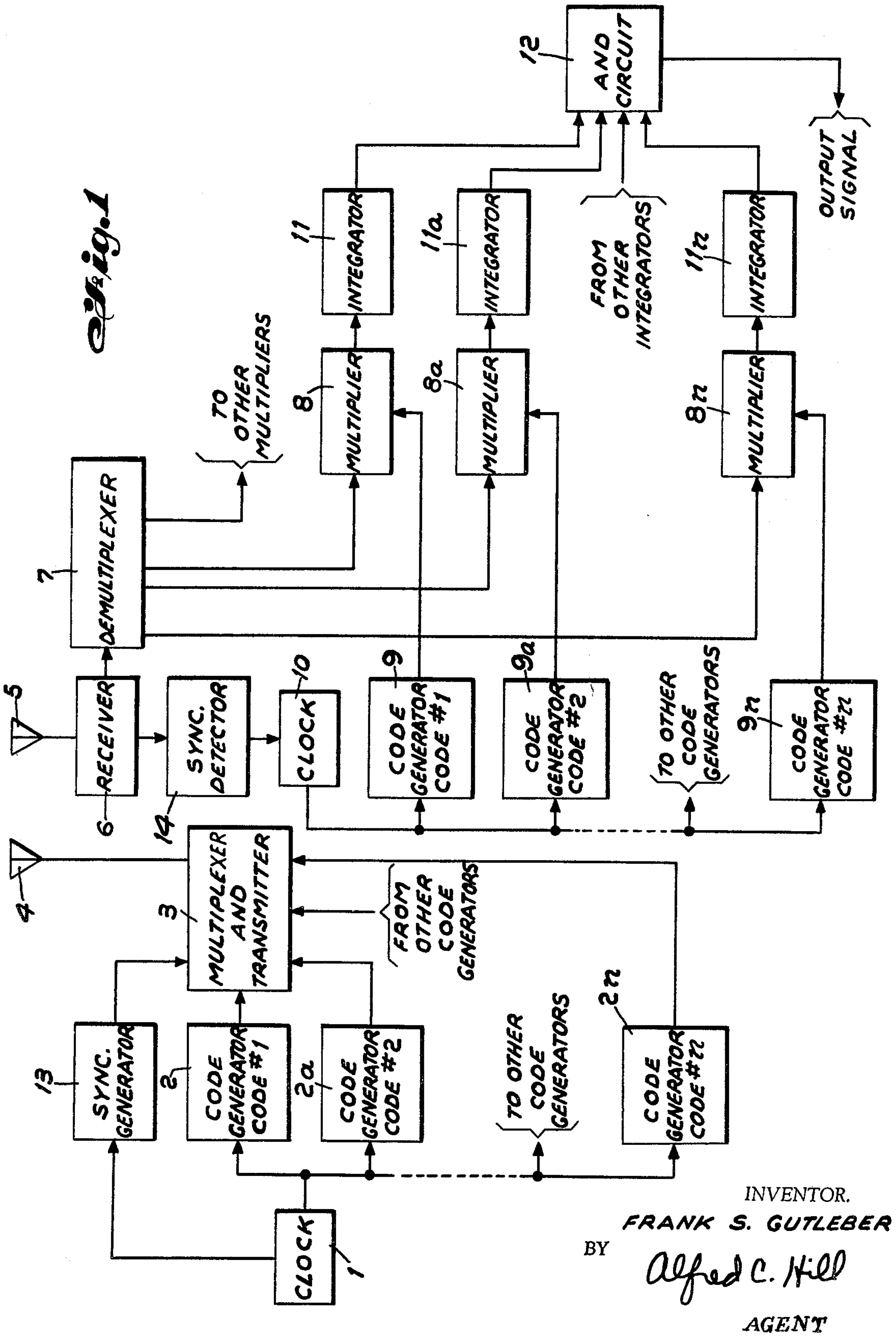
FIG. 1 is a block diagram of a system in accordance with the principles of this invention.

Referring to FIG. 1, the system in accordance with this invention incorporates the techniques of both correlation detection and coincidence detection which enables the achievement of an impulse autocorrelation function with a very large quantity of simple binary codes. The desired signal output is accomplished by orthogonally multiplexing two or more separate distinct codes with the requirement that the autocorrelation function of at least one of the codes multiplexed is equal to zero at all times of non-coincidence between the code signals and their replicas and provides a peak output upon coincidence of the code signals and their replicas.

As illustrated, clock 1 controls the operation of a plurality of code generators 2, **2*a* and 2*n*. These code generators may take the form of the fundamental code generators disclosed in the first three cited copending applications. The code signal output of generators 2–2*n* are coupled to multiplexer and transmitter 3 with the output therefrom being propagated from antenna 4 to antenna 5. The multiplexed code signals received on antenna 5 are coupled to receiver 6 and, hence, to demultiplexer 7. The code signals as separated in demultiplexer 7 are coupled to autocorrelation detectors each of which includes multiplier 8 which is coupled to multiplexer 7 and responds to one of the separated code signals, such as code #1. A replica of code #1 is provided by generator 9 which is controlled by clock 10. Generators 9 will be similar in configuration to generators 2. When code #1 and its replica have been multiplied in multiplier 8, the output therefrom is coupled to an integrator 11 and, hence, to AND circuit 12**. Each of the code signals #2 to #*n* are operated upon by the same type of autocorrelation detector and provide the autocorrelation detected outputs to AND circuit 12. When all of the code signals and their replicas are in time coincidence an impulse output will appear from AND circuit 12. No output from AND circuit 12 will appear at any other time, since, as stipulated hereinabove, at least one of the code signals has an autocorrelation function that is zero at all times other than at the time of coincidence between the code and its replica. Thus, at all other times at least one of the inputs to AND circuit 12 will be zero resulting in a zero output signal. Thus, there is obtained the desired output signal having an impulse autocorrelation function.

Clocks 1 and 10 may be highly stabilized clocks so that they are in synchronism one with the other. However, known synchronizing techniques may be employed and include synchronizing generator 13 whose synchronizing signal output is multiplexed with the code signals at multiplexer and transmitter 3 for propagation to receiver 6 wherein the synchronizing signal is detected in synchronizing detector 14 to synchronize clock 10 with clock 1.

The type of multiplexing employed in the system of FIG. 1 has not been stipulated since numerous types of multiplexing could be employed, for instance, frequency, time, quadrature phase, space, and the like. The basic requirement placed upon the multiplexing arrangement is that the separate code signals be made orthogonal to each other, that is, not interfering with each other.

The code signals used in the system may be of the closed code type, that is, the codes are completely filled in, or the codes may be of the open code type, that is, aperiodic codes which have blanks in certain of the digit time slots. Additionally, codes of the different lengths may be employed. In essence, the arrangement of FIG. 1 adds flexibility to the concept of multiplexed code classes by allowing some sacrifice in the detection efficiency. Quantitatively, the degradation would be approximately $1/\sqrt{n}$ for $n$ multiplexed code signals.

Referring to FIG. 2, there is illustrated therein 16 eight bit closed codes which meet the requirements set forth hereinabove for the operation of FIG. 1 together with their autocorrelation function times the number of digits of the code signal. It will be noted by observation that a large quantity of codes may be paired with each code to provide the desired output signal. For example, code #1 could be multiplexed with code #2, 3, 4, 6, 7, 8, 9, 12, 13 or 16 and achieve the desired output signal having an impulse autocorrelation function. It should be noted, however, that the operation of the system of FIG. 1 is not limited to pairs of codes but rather any number of code signals can be employed provided at least one of these code signals has the required autocorrelation function. Thus, codes #1, 2, 3 and 4, for instance, could be multiplexed together and provide the desired output signal.

FIG. 3 illustrates 8 codes and a mate for each of these codes together with their autocorrelation function times the number of code digits in the code and its mate that will operate in the system of FIG. 1 to provide the desired output signal. It should be noted that the code contains a blank therein and, thus, the codes illustrated in FIG. 3 are examples of open code pairs, that is, a type of code which does not require complete code fill-in.

While I have described above the principles of my invention in connection with specific apparatus it is to be clearly understood that this description is made only by way of example and not as a limitation to the scope of my invention as set forth in the objects thereof and in the accompanying claims.

I claim:

1. A system to provide an output signal having an impulse autocorrelation function including an impulse output at a given time and a zero output at all other times comprising:
   - a source of a plurality of coded signals, at least one of said coded signals having an autocorrelation function including an impulse output at a given time and a zero output at all other times;
   - a plurality of correlation detection means, one for each of said coded signals, copled to said source; and
   - a coincidence means coupled to each of said detection means responsive to the output signals therefrom to provide said output signal.

2. A system according to claim 1, wherein said coincidence means includes
   an AND circuit.

3. A system according to claim 1, wherein each of said correlation means includes
   an autocorrelation detector.

4. A system according to claim 3, wherein said autocorrelation detector includes
   - a code generator to provide a replica of the associated one of said code signals, a multiplier coupled to said generator and said source, and an integrator coupled to said multiplier.

5. A system according to claim 1, wherein said source includes a plurality of code generators, one for each of said code signals, a multiplexer coupled to said code generators, a transmitter coupled to said multiplexer, a receiver coupled to said transmitter, and a demultiplexer coupled to said receiver.

6. A system according to claim 1, wherein said coincidence means includes an AND circuit; and each of said correlation means includes an autocorrelation detector.

7. A system according to claim 6, wherein said autocorrelation detector includes a code generator to provide a replica of the associated one of said code signals, a multiplier coupled to said generator and said source, and an integrator coupled between said multiplier and said AND circuit.

8. A system according to claim 1, wherein said source includes a plurality of code generators, one for each of said code signals, a multiplexer coupled to said code generators, a transmitter coupled to said multiplexer, a receiver coupled to said transmitter, and a demultiplexer coupled to said receiver; and each of said correlation means includes an autocorrelation detector coupled between said demultiplexer and said coincidence means.

9. A system according to claim 8, wherein said coincidence means includes an AND circuit.

10. A system according to claim 1, wherein said source includes a plurality of code generators, one for each of said code signals, a multiplexer coupled to said code generators, a transmitter coupled to said multiplexer, a receiver coupled to said transmitter, and a demultiplexer coupled to said receiver; and said coincidence means includes an AND circuit.

References Cited

UNITED STATES PATENTS 3,432,619 3/1969 Blasbalg.

RALPH D. BLAKESLEE, Primary Examiner

U.S. Cl. X.R.

340—348; 343—17.1